US012634407B2

(12) United States Patent
Han et al.

(10) Patent No.: US 12,634,407 B2
(45) Date of Patent: May 19, 2026

(54) METHOD FOR PROCESSING RGBIR MULTI-FRAME HDR WITH LUMA

(71) Applicant: ICATCH TECHNOLOGY, INC., Hsinchu County (TW)

(72) Inventors: Hsin-Pei Han, Hsinchu County (TW); Chia-Ying Tsai, Hsinchu County (TW); Cheng-Yu Wu, Hsinchu County (TW)

(73) Assignee: ICATCH TECHNOLOGY, INC., Hsinchu County (TW)

( * ) Notice: Subject to any disclaimer, the term of this patent is extended or adjusted under 35 U.S.C. 154(b) by 268 days.

(21) Appl. No.: 18/661,732

(22) Filed: May 13, 2024

(65) Prior Publication Data

US 2025/0211701 A1     Jun. 26, 2025

Related U.S. Application Data

(60) Provisional application No. 63/614,634, filed on Dec. 25, 2023.

(51) Int. Cl.
| | |
|---|---|
| *H04N 1/60* | (2006.01) |
| *G06T 5/20* | (2006.01) |
| *G06T 5/40* | (2006.01) |
| *G06T 5/50* | (2006.01) |
| *G06T 5/70* | (2024.01) |
| *G06T 5/92* | (2024.01) |

(52) U.S. Cl.
CPC ................. *H04N 1/60* (2013.01); *G06T 5/20* (2013.01); *G06T 5/40* (2013.01); *G06T 5/50* (2013.01); *G06T 5/70* (2024.01); *G06T 5/92* (2024.01); *G06T 2207/10024* (2013.01); *G06T 2207/20208* (2013.01); *G06T 2207/20221* (2013.01)

(58) Field of Classification Search
CPC .... H04N 1/60; G06T 5/92; G06T 5/70; G06T 5/20; G06T 5/40; G06T 5/50; G06T 2207/10024; G06T 2207/20208; G06T 2207/20221
See application file for complete search history.

(56) References Cited

U.S. PATENT DOCUMENTS

| | | | | |
|---|---|---|---|---|
| 12,108,168 | B1 * | 10/2024 | Pawlik .................... | H04N 9/77 |
| 2017/0374299 | A1 * | 12/2017 | Liu ........................... | G06T 5/50 |
| 2019/0110037 | A1 * | 4/2019 | Lukac ................... | H04N 9/646 |
| 2019/0378257 | A1 * | 12/2019 | Fan ........................ | H04N 23/72 |

* cited by examiner

*Primary Examiner* — David Perlman
(74) *Attorney, Agent, or Firm* — Winston Hsu

(57) ABSTRACT

A Method for processing RGBIR (Red Green Blue Infrared) multi-frame HDR (High Dynamic Range) with luma includes capturing a plurality of RGBIR raw images with different exposure times by at least one camera, generating a plurality of luma images using a color filter array luma (CFAL) filter according to the plurality of RGBIR raw images, performing IR color correction to generate a plurality of corrected RGBIR raw images according to the RGBIR raw images, performing HDR fusion to generate a HDR RGBIR raw image according to the plurality of luma images and the plurality of corrected RGBIR raw images, generating gradients according to the HDR RGBIR raw image and the plurality of luma images, and performing interpolation to generate a result image according to at least the gradients and the HDR RGBIR raw image.

32 Claims, 6 Drawing Sheets

Figure 1:
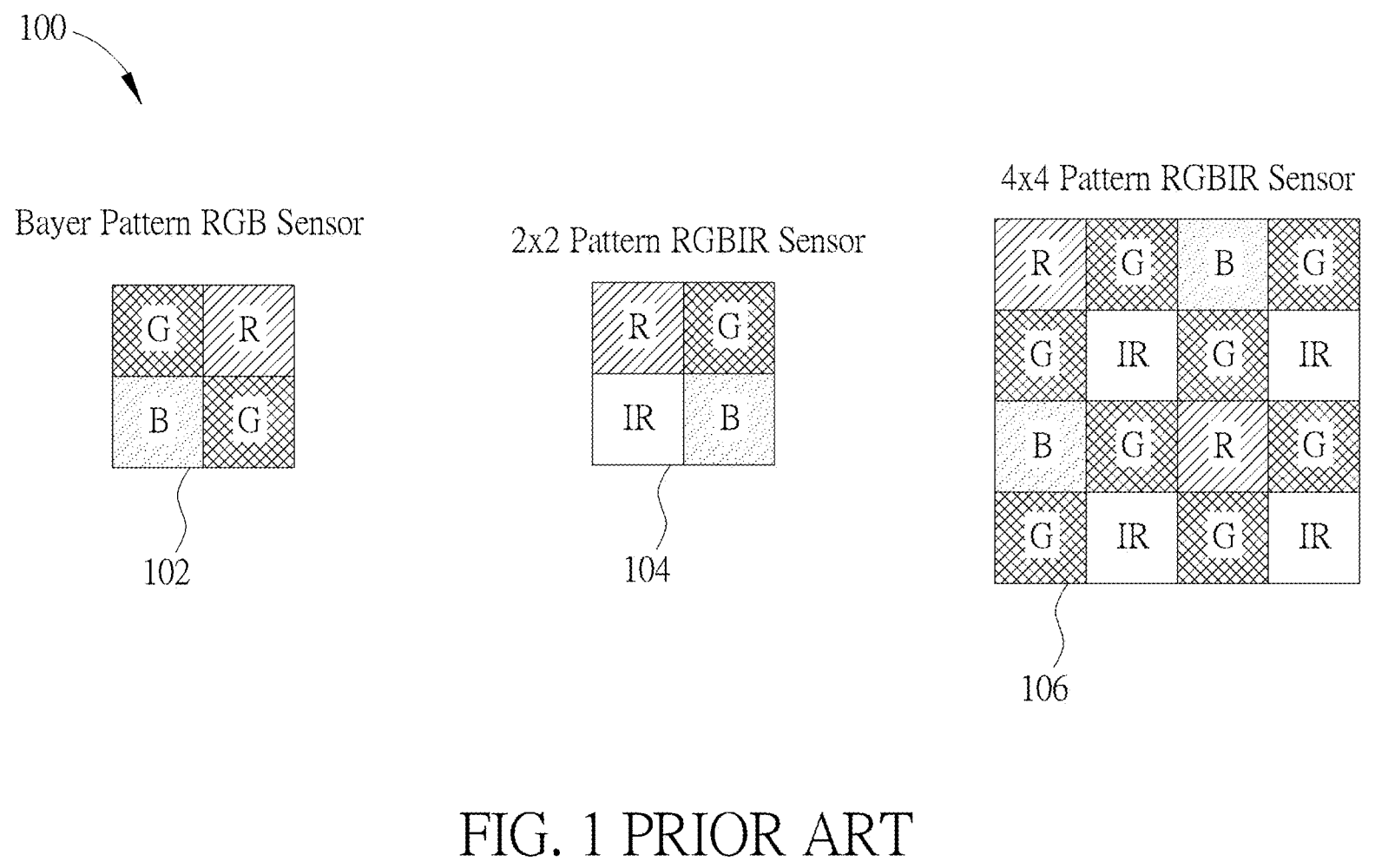

Bayer Pattern RGB Sensor

| G | R |
|---|---|
| B | G |

102

2x2 Pattern RGBIR Sensor

| R | G |
|---|---|
| IR | B |

104

4x4 Pattern RGBIR Sensor

| R | G | R | G |
|---|---|---|---|
| G | IR | G | IR |
| G | R | B | G |
| B | G | IR | G |

METHOD FOR PROCESSING RGBIR MULTI-FRAME HDR WITH LUMA

CROSS REFERENCE TO RELATED APPLICATIONS

This application claims the benefit of U.S. Provisional Application No. 63/614,634, filed on Dec. 25, 2023. The content of the application is incorporated herein by reference.

BACKGROUND OF THE INVENTION

1. Field of the Invention

The present invention is related to a method for processing RGBIR (Red Green Blue Infrared) multi-frame HDR (High Dynamic Range), in particularly, related to a method for processing RGBIR multi-frame HDR with luma.

2. Description of the Prior Art

High Dynamic Range Imaging (HDRI or HDR), commonly used in computer graphics and film photography, refers to a set of techniques and technologies that allow images or videos to have a greater dynamic range than ordinary bitmap image technology. The primary goal of high dynamic range imaging is to faithfully represent the wide range of brightness found in the real world, spanning from direct sunlight to the darkest shadows.

Initially, high dynamic range imaging was employed solely for computer-generated images. However, over time, methods were developed to generate high dynamic range images from photographs with varying exposure levels. As digital cameras gained popularity and desktop software became user-friendly, more many amateur photographers began using high dynamic range imaging techniques to create photos that capture the full range of brightness in challenging scenes.

Beyond photography, high dynamic range has numerous other applications. For instance, it plays a crucial role in Ultra HD television standards, where various HDR technologies define larger brightness ranges, wider color gamuts, and greater bit depths compared to traditional standard dynamic range (SDR) images. These technologies include HDR10, HDR10+, Dolby Vision, and HLG (Hybrid Log-Gamma). When displaying HDR images, tone mapping is often applied, and they are used alongside other full-screen display effects.

Unlike traditional digital images, HDR images store information related to real-world luminance or radiance rather than just colors displayed on screens or paper. Additionally, HDR images often use linear encoding, providing a more accurate representation of brightness. In summary, high dynamic range imaging enhances our ability to capture and display the full spectrum of light, making it a valuable tool in various fields beyond photography.

Direct light hitting a person's face or reflective objects can negatively impact vision. To mitigate this, IR invisible light can be employed. Modern electronic image sensor suppliers utilize a new photosensitive arrangement called RGB-IR. This method allows a single camera to achieve both vision and information acquisition, resulting in a sharper vision solution for artificial intelligence (AI) applications: the RGB-IR camera.

The image sensor employs optical filters to selectively filter and screen red (R), green (G), and blue (B) light.

Specific photodiodes then receive this energy and convert it into electronic signals. Subsequently, the image signal processor (ISP) calculates the ratio of R, G, and B amounts to restore color. The color filter array (CFA), akin to a filter, mainly determines the transmittance of the environmental spectrum. Black and white cameras utilize transparent or no filters, while RGB color filters allow the visible spectrum to pass.

The Bayer filter, commonly employed in color cameras, is specifically designed for imaging within the visible band (wavelength range of 400 nm to 660 nm). It organizes RGB color filters on the photosensitive element grid, creating a mosaic known as the color filter array (CFA). Each pixel is equipped with color filters for red (R), green (G), and blue (B), allowing it to sense the energy of each color.

An RGB-IR camera combines the capabilities of capturing both visible light and infrared (IR) light in a single sensor. Unlike traditional color cameras, which suffer from color corruption due to overlapping sensitivity to both visible and IR wavelengths, an RGB-IR camera provides a cleaner separation of these two spectral ranges. The key innovation lies in the color filter array (CFA) used by the sensor. Instead of the standard Bayer pattern (BGGR), an RGB-IR camera incorporates an additional set of pixels specifically dedicated to IR light. These pixels allow only IR wavelengths to pass through, ensuring accurate IR imaging without color distortion.

The standard Bayer CFA consists of red (R), green (G), and blue (B) pixels arranged in a specific pattern. However, in an RGB-IR camera, this pattern includes IR-sensitive pixels that allow only IR light to pass through. This facilitates multi-band imaging, capturing both visible and IR spectrum images simultaneously.

RGB-IR cameras seamlessly adjust to changing day and night conditions. They are ideal for applications requiring round-the-clock image and video capture. Unlike traditional cameras that rely on a mechanical IR cut filter (switched during day and night), RGB-IR cameras eliminate the need for such components. This enhances the camera's lifetime and robustness. By providing a dedicated IR channel, RGB-IR cameras improve the quality of RGB output. Accurate measurement of IR light in the RGB component allows for proper color correction.

In summary, RGB-IR cameras revolutionize embedded vision applications by providing accurate color separation, adaptability, and improved image quality across visible and IR spectrum. In a low brightness environment, RGB-IR cameras play a crucial role in enhancing High Dynamic Range (HDR) imaging by leveraging the infrared (IR) spectrum. RGB-IR cameras offer a powerful solution for achieving high-quality HDR imaging across various applications.

FIG. 1 illustrates color filter arrays (CFA) 100 of an RGB sensor and an RGBIR sensor according to the prior art. Displayed within the FIG. 1 are three CFAs: CFA 102 with a Bayer pattern for the RGB sensor, CFA 104 with a 2×2 pattern for the RGBIR sensor, and CFA 106 with a 4×4 pattern for the RGBIR sensor. The elemental ratio of red, green, and blue in CFA 102 is 1:2:1, respectively. For CFA 104, the ratio of red, green, blue, and infrared (IR) pixels is 1:1:1:1, and for CFA 106, it is 1:4:1:2. While traditional RGB sensors are limited to detecting visible light, RGBIR sensors have the added capability of detecting IR light. This makes them particularly advantageous in scenarios where visible light is scarce but an IR light source is present, such as in night-time surveillance cameras.

A single image can suffer from high dynamic scenes, such as backlight scene and night-time street light scene. A high dynamic range (HDR) image can be obtained by blending a short exposure image and a long exposure image.

FIG. 2 illustrates a schematic diagram of a prior art high dynamic range (HDR) fusion method 200. The method utilizes two raw images: a long exposure RGBIR raw image 202, and a short exposure RGBIR raw image 214. The process begins with IR correction 204 applied to the long exposure RGBIR raw image 202, resulting in an IR-corrected long exposure RGBIR raw image. Subsequently, interpolation 206 is performed on the IR-corrected long exposure RGBIR raw image to produce a long exposure RGB raw image 208. In parallel, IR correction 216 is carried out on the short exposure RGBIR raw image 214, yielding an IR-corrected short exposure RGBIR raw image. This is followed by interpolation 218 on the IR-corrected short exposure RGBIR raw image to create a short exposure RGB raw image 220. Finally, HDR fusion 210 is executed on both the long exposure RGB raw image 208 and the short exposure RGB raw image 220, merging them to form a HDR RGB raw image 212.

In the method 200, both the long exposure RGBIR raw image 202 and the short exposure RGBIR raw image 214 are subjected to separate IR corrections 204, 216 and interpolations 206, 218 before undergoing the HDR fusion 210. The interpolations 206, 218 are executed twice, which suggests increased computational costs in the prior art. Additionally, the method 200 requires a large amount of buffer capacity to hold intermediate data. Moreover, the IR pixel information is not utilized in the HDR fusion 210 because no IR information is contained in both the long exposure RGB raw image 208 and the short exposure RGB raw image 220, leading to potential inefficiencies. For instance, important details that could only be captured by IR imaging might be missed out. If the HDR fusion process could incorporate IR information, it could potentially produce a more detailed and informative result image. This is why the possibility of utilizing IR information in the HDR fusion 210 is being considered. It could lead to the generation of images with a broader range of information, enhancing the overall effectiveness of the procedure.

SUMMARY OF THE INVENTION

An embodiment provides a method for processing RGBIR (Red Green Blue Infrared) multi-frame HDR (High Dynamic Range) with luma. The method for RGBIR multi-frame with luma includes capturing a plurality of RGBIR raw images with different exposure times by at least one camera, generating a plurality of luma images using a color filter array luma (CFAL) filter according to the plurality of RGBIR raw images, performing IR color correction to generate a plurality of corrected RGBIR raw images according to the RGBIR raw images, performing HDR fusion to generate a HDR RGBIR raw image according to the plurality of luma images and the plurality of corrected RGBIR raw images, generating gradients according to the HDR RGBIR raw image and the plurality of luma images, and performing interpolation to generate a result image according to at least the gradients and the HDR RGBIR raw image.

An embodiment provides an apparatus for processing RGBIR (Red Green Blue Infrared) multi-frame HDR (High Dynamic Range) with luma. The apparatus for RGBIR multi-frame HDR with luma includes a plurality of cameras, an RGBIR HDR image processing circuit, an image processing circuit, and a display. The plurality of cameras is used to capture a plurality of RGBIR raw images with different exposure times. The RGBIR HDR image processing circuit is coupled to the plurality of cameras, and used to generate a plurality of luma images using a color filter array luma (CFAL) filter according to the plurality of RGBIR raw images, to perform IR color correction to generate a plurality of corrected RGBIR raw images according to the RGBIR raw images, to perform HDR fusion to generate a HDR RGBIR raw image according to the plurality of luma images and the plurality of corrected RGBIR raw images, to generate gradients according to the HDR RGBIR raw image and the plurality of luma images, and to perform interpolation to generate a result image according to at least the gradients and the HDR RGBIR raw image. The image processing circuit is coupled to the RGBIR HDR image processing circuit, and used to perform image processing on the result image to generate a display image. The display is coupled to the image processing circuit and used to display the display image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 illustrates color filter arrays (CFA) of an RGB sensor and an RGBIR sensor according to the prior art.

DETAILED DESCRIPTION

Figure 2:
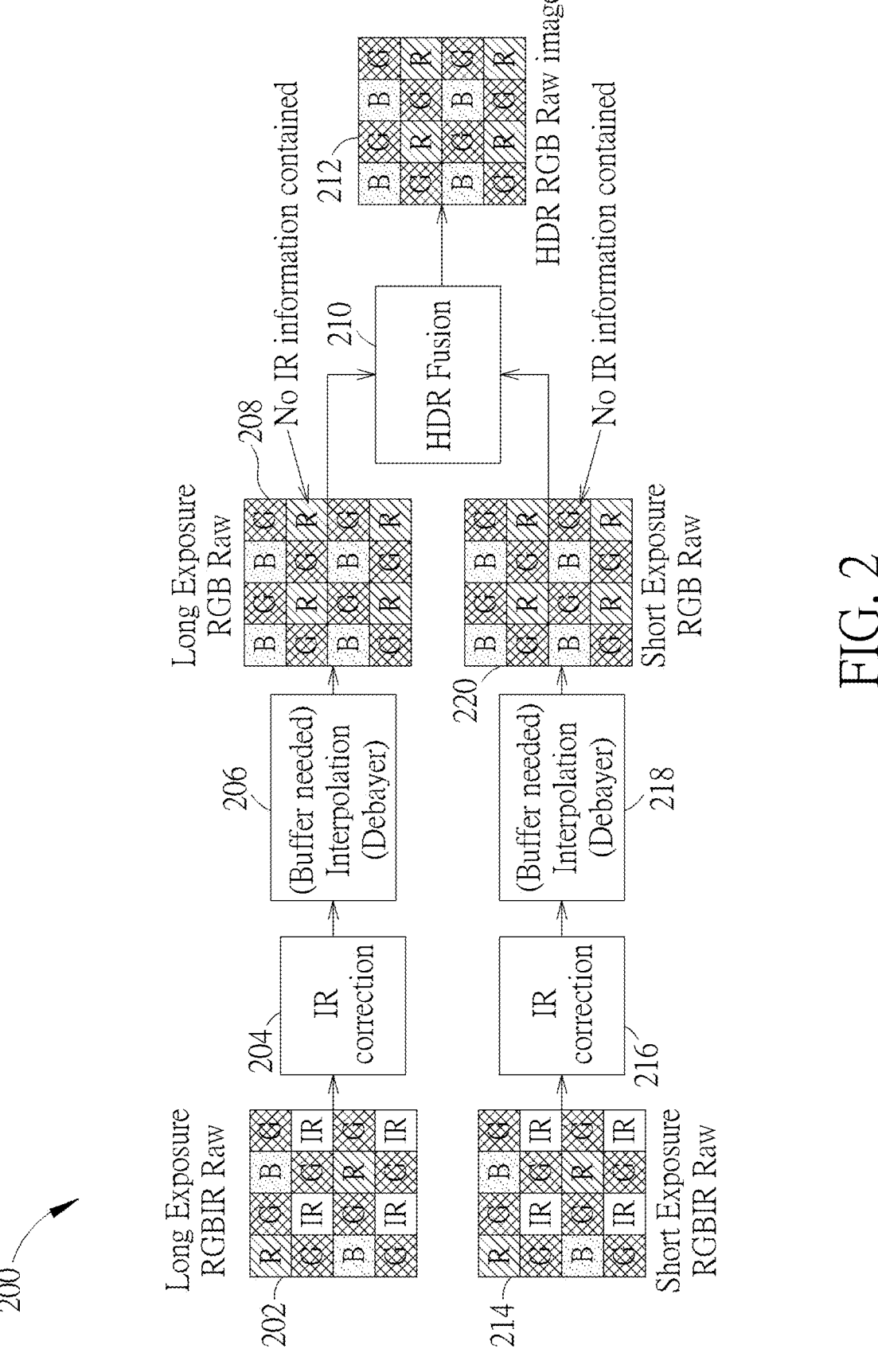
FIG. 2 illustrates a schematic diagram of a prior art high dynamic range (HDR) fusion method.
Figure 3:
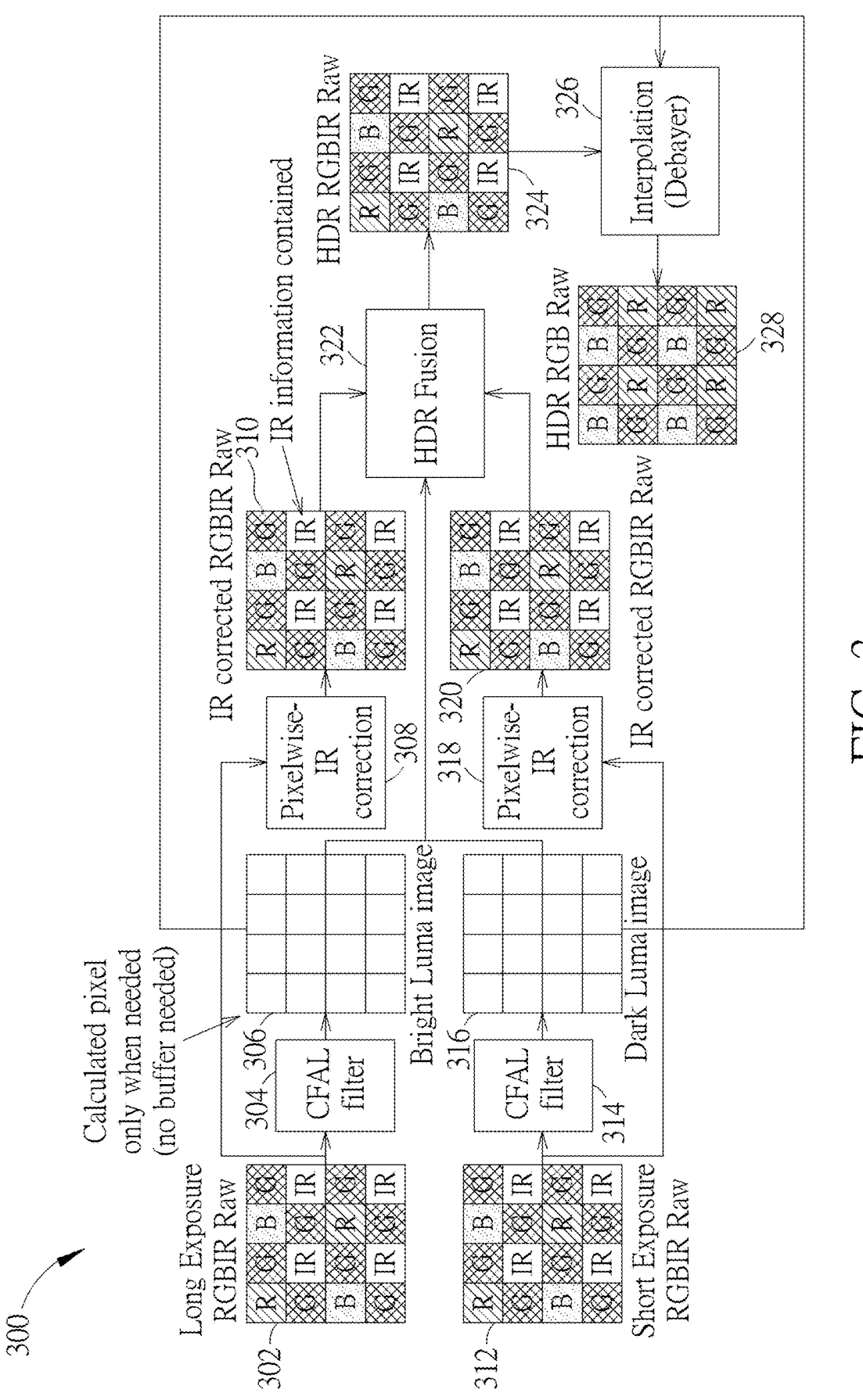
FIG. 3 is a schematic diagram of a method for processing RGBIR (Red Green Blue Infrared) multi-frame HDR (High Dynamic Range) with luma according to an embodiment of the present invention.

FIG. 3 is a schematic diagram of a method 300 for processing RGBIR (Red Green Blue Infrared) multi-frame HDR (High Dynamic Range) with luma according to an embodiment of the present invention. Initially, two RGBIR raw images are utilized: a long exposure RGBIR raw image 302 with a long exposure time and a short exposure RGBIR raw image 312 with a short exposure time. The embodiment proposes color filter array luma (CFAL) filters 304, 314 to generate luma images 306, 316 from the RGBIR raw images 302, 312. Through the CFAL filter 304, a bright luma image 306 is generated from the long exposure RGBIR raw image 302. Through the CFAL filter 314, a dark luma image 316 is generated from the short exposure RGBIR raw image 312. Subsequently, pixelwise-IR correction 308 is performed on the long exposure RGBIR raw image 302 to generate a long exposure IR corrected RGBIR raw image 310. Pixelwise-IR correction 318 is performed on the short exposure RGBIR raw image 312 to generate a short exposure IR corrected RGBIR raw image 320. Thereafter, HDR fusion 322 is performed on the long exposure IR corrected RGBIR raw image 310 and the short exposure IR corrected RGBIR raw image 320 according to the bright luma image 306 and the dark luma image 316 to generate a HDR RGBIR raw image 324. Finally, interpolation 326 is performed on the HDR RGBIR raw image 324 according to the bright luma image 306 and the dark luma image 316 to generate a HDR RGB Raw image 328.

In this embodiment, low-cost CFAL filters 304, 314 are used to generate luma images 306, 316 directly and the luma images 306, 316 are used for HDR fusion 322 and interpolation 326. The CFAL filters 304, 314 can output luma pixels whenever the CFAL filters 304, 314 are placed on the input RGBIR raw images 302, 312, so there is no need to store the luma images 306, 316 in buffer, which is buffer efficient. Pixelwised IR corrections 308, 318 are performed before HDR fusion 322 to ensure colors of the long exposure RGBIR raw image 302 and the short exposure RGBIR raw image 312 are corrected before inputting to HDR fusion 322. Since interpolation 326 is processed after HDR fusion 322, it needs less buffer and calculation than the prior art. Since the HDR fusion 322 is performed before interpolation 326, the HDR fusion 322 contains IR pixel information and preserves more image detail.

Figure 4:
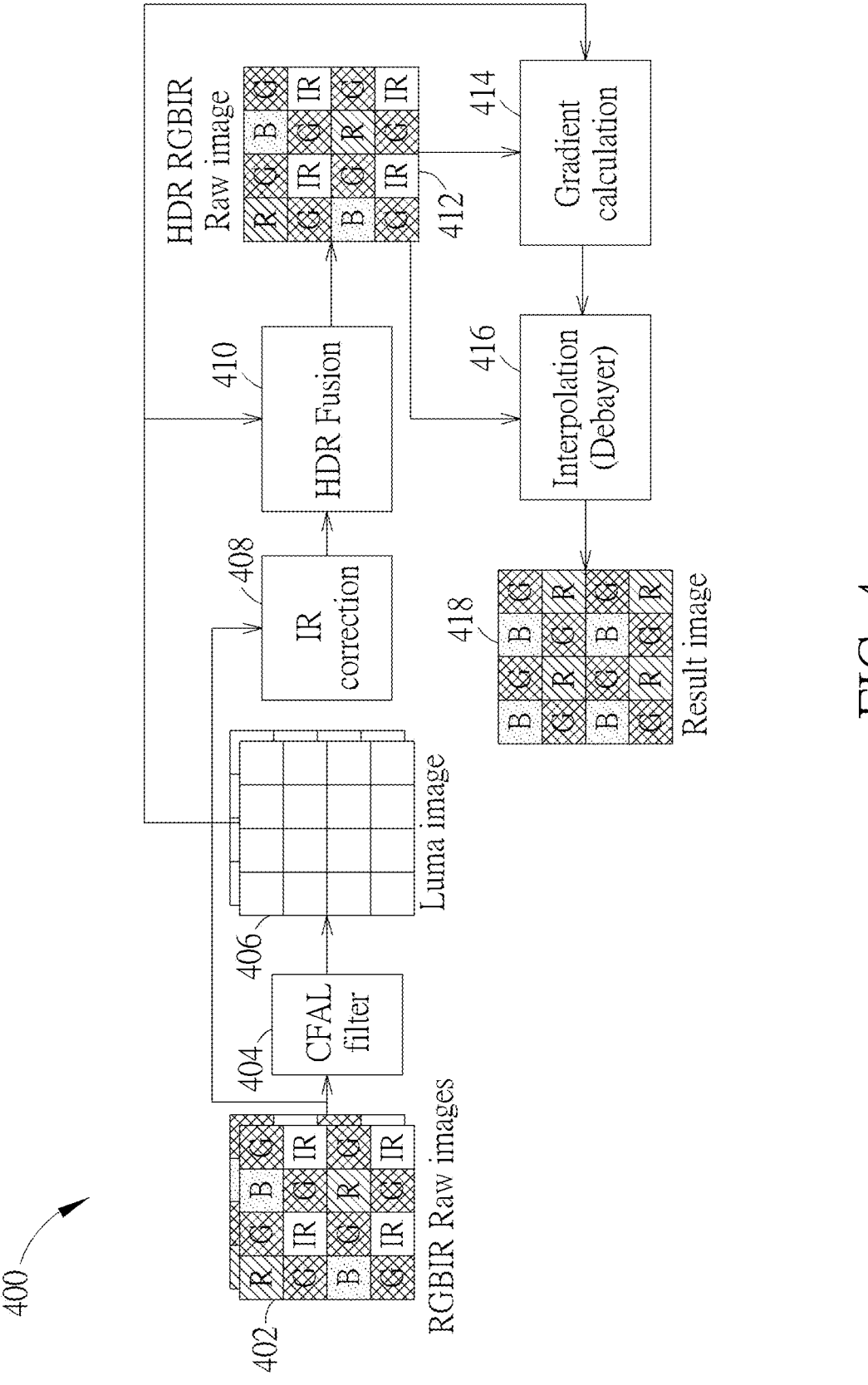
FIG. 4 is a schematic diagram of a method for processing RGBIR multi-frame HDR with luma according to another embodiment of the present invention.

FIG. 4 is a schematic diagram of a method 400 for processing RGBIR multi-frame HDR with luma according to another embodiment of the present invention. Initially, a plurality of RGBIR raw images 402 are captured with different exposure times by at least one camera. Subsequently, a plurality of luma images 406 are generated using a color filter array luma (CFAL) filter 404 according to the plurality of RGBIR raw images 402. Moreover, IR correction 408 is performed to generate a plurality of corrected RGBIR raw images according to the RGBIR raw images 402. Thereafter, HDR fusion 410 is performed to generate a HDR RGBIR raw image 412 according to the plurality of luma images 406 and the plurality of corrected RGBIR raw images. Afterwards, gradients are generated according to the HDR RGBIR raw image 412 and the plurality of luma images 406. At last, interpolation 416 is performed to generate a result image 418 according to at least the gradients and the HDR RGBIR raw image 412.

If interpolation 416 is performed to generate the result image 418 according to the gradients, and the HDR RGBIR raw image 412, the result image 418 can be a HDR RGB raw image, or a full RGB and IR HDR image. If interpolation 416 is performed to generate the result image 418 according to the gradients, the HDR RGBIR raw image 412, and the plurality of luma images 406, the result image 418 can be a HDR RGB CFA (Color Filter Array) raw image, a HDR RGBW (Red Green Blue White) raw image, a HDR RCCB (Red Clear Clear Blue) raw image, or a HDR RCCC (Red Clear Clear Clear) raw image.

If the result image 418 is an IR HDR image, the IR HDR image and/or the plurality of luma images 406 can be used to control the exposure time of the at least one camera, and a histogram can be calculated based on the IR HDR image and/or the plurality of luma images 406. When the pixels of high luma area in the histogram exceed 50%, the exposure time of the camera needs to be reduced. When the pixels of low luma area in the histogram exceed 50%, the exposure time of the camera needs to be increased. 50% is only an example, the threshold can be any number between 0% and 100%.

If the result image 418 is an IR HDR image, the IR HDR image and/or the plurality of luma images 406 can be used to control the light source of the at least one camera, and a histogram can be calculated based on the IR HDR image and/or the plurality of luma images 406. When the pixels of high luma area in the histogram exceed 50%, the power of the light source needs to be reduced. When the pixels of low luma area in the histogram exceed 50%, the power of the light source needs to be increased. 50% is only an example, the threshold can be any number between 0% and 100%.

In a 4×4 RGBIR pattern, the luma image 406 is derived directly from the RGBIR raw image 402 by the CFAL filter 404, noted for its cost efficiency. The CFAL filter 404 comprises an N by N matrix, where N is an odd integer greater than 4. Within the CFAL filter 404, the weighted sum of the pixel count for R, B, IR, G maintains a fixed ratio across all input patterns. In an embodiment, the fixed ratio can be 1:1:2:4. Additionally, the sum of all elements within the CFAL filter 404 is constrained to equal 1. This design ensures that the luma value calculated by the CFAL filter 404 consistently reflects the same proportion of R, G, B, and IR, regardless of its position on the RGBIR raw image 402. As a result, the CFAL filter 404 serves as a reliable indicator for assessing brightness and determining edge direction.

Figure 5:
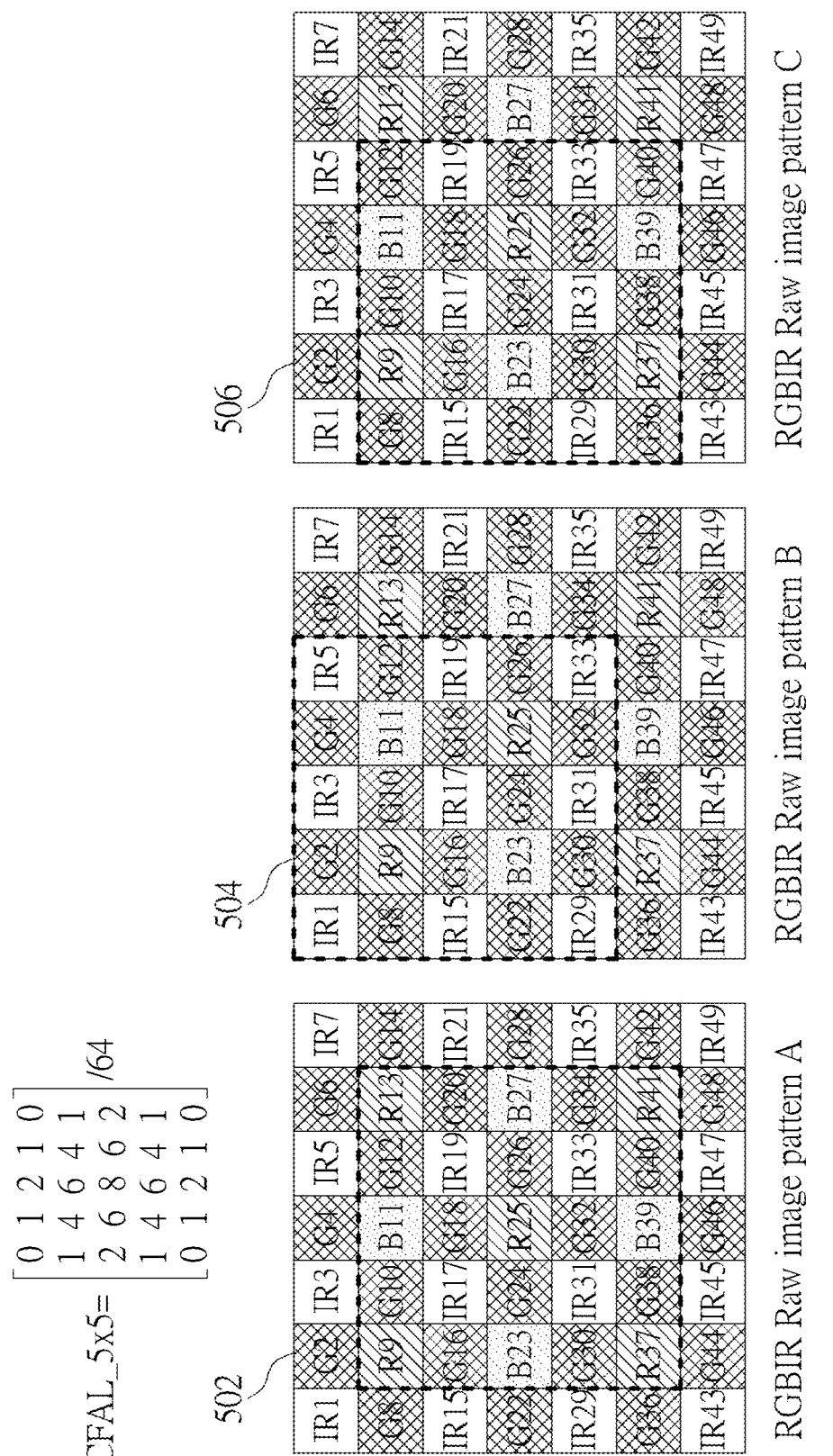
FIG. 5 is an example of a 5×5 CFAL filter for a 4×4 RGBIR pattern according to an embodiment of the present invention.

FIG. 5 is an example of a 5×5 CFAL filter for a 4×4 RGBIR pattern 106 according to an embodiment of the present invention. The 5×5 CFAL filter is shown in FIG. 5 with the 2-dimensional matrix:

$$CFAL\_5 \times 5 = \begin{bmatrix} 0 & 1 & 2 & 1 & 0 \\ 1 & 4 & 6 & 4 & 1 \\ 2 & 6 & 8 & 6 & 2 \\ 1 & 4 & 6 & 4 & 1 \\ 0 & 1 & 2 & 1 & 0 \end{bmatrix} /64$$

The sum of the elements in the CFAL 5×5 filter is (0+1+2+1+0+1+4+6+4+1+2+6+8+6+2+1+4+6+4+1+0+1+2+1+0)/64=1. When the CFAL 5×5 filter is disposed on the RGBIR raw image as pattern A 502 in FIG. 5, the weighted sums of pixel numbers for R, B, IR and G channels can be calculated as:

R: (0*R9+0*R13+8*R25+0*R37+0*R41)=R/8
B: (2*B11+2*B23+2*B27+2*B39)/64=B/8
IR: (4*IR17+4*IR19+4*IR31+4*IR33)/64=IR/4
G: (1*G10+1*G12+1*G16+6*G18+1*G20+6*G24+6*G26+1*G30+6*G32+1*G34+1*G38+1*G40)/64=G/2

The weighted sums of pixel numbers for R, B, IR, G are in the ratio of 1:1:2:4.

When the CFAL 5×5 filter is disposed on the RGBIR raw image as pattern B 504 in FIG. 5, the weighted sums of pixel numbers for R, B, IR and G channels can be calculated as:

R: (4*R9+4*R25)=R/8
B: (4*B11+4*B23)/64=B/8
IR: (0*IR1+2*IR3++0*IR5+2*IR15+8*IR17+2*IR19+0*IR29+2*IR31+0*IR33)/64=IR/4
G: (1*G2+1*G4+1*G8+6*G10+1*G12+6*G16+6*G18+1*G22+6*G24+1*G26+1*G3 0+1*G32)/64=G/2

The weighted sums of pixel numbers for R, B, IR, G are in the ratio of 1:1:2:4.

When the CFAL 5×5 filter is disposed on the RGBIR raw image as pattern C 506 in FIG. 5, the weighted sums of pixel numbers for R, B, IR and G channels can be calculated as:

R: (1*R9+6*R25+1*R37)=R/8
B: (1*B11+6*B23+1*B39)/64=B/8
IR: (1*IR15+6*IR17+1*IR19+1*IR29+6*IR31+1*IR33)/64=IR/4
G: (0*G8+2*G10+0*G12+4*G16+4*G18+2*G22+8*G24+2*G26+4*G30+4*G32+0*G36+2*G38+0*G40)/64=G/2

The weighted sums of pixel numbers for R, B, IR, G are in the ratio of 1:1:2:4.

As shown in FIG. 5, the weighted sums of pixel numbers of the CFAL_5×5 filter is always fixed to a ratio of R, B, IR, G=1:1:2:4. In an embodiment, the CFAL can be 5×5, 7×7, 9×9, 11×11 and N×N, where N is an odd integer larger than 4. The sum of all elements within the CFAL filter 404 is constrained to equal 1, and the weighted sums of pixel numbers for R, B, IR, G are in the ratio of 1:1:2:4. In another embodiment for a 2×2 RGBIR pattern, the CFAL can be 3×3, 5×5, 7×7, 9×9 and M×M, where M is an odd integer larger than 2. The sum of all elements within the CFAL filter 404 is constrained to equal 1, and the weighted sums of pixel numbers for R, B, IR, G are in the ratio of 1:1:1:1. An example of the CFAL_3×3 is shown as:

$$CFAL\_3\times3 = \begin{bmatrix} 1 & 2 & 1 \\ 2 & 4 & 2 \\ 1 & 2 & 1 \end{bmatrix}/16$$

This form of 2-dimensional matrix satisfies the constraints of the CFAL filter 404, and thus the CFAL_3×3 can be used in the 2×2 RGBIR pattern 104 to generate the luma images 406.

The luma images 406, derived from the RGBIR raw images 402 via the CFAL filter 404, serve as a gradient reference in gradient calculation 414. The gradient reference is not only for interpolating RGBIR to RGB images but also for converting RGBIR to full RGB and IR images, as well as other RGB color filter array (CFA) types like RGBW, RCCB, RCCC, etc. The luma images 406 are versatile, aiding in various applications such as auto exposure control, lighting control, and edge enhancement. Without the CFAL filter 404, RGB or IR brightness would be used for HDR fusion 410, which could lead to suboptimal blending results when used independently. To address this issue, a method for processing RGBIR multi-frame HDR that incorporates luma with the CFAL filter 404 is introduced to enhance the fusion process.

Figure 6:
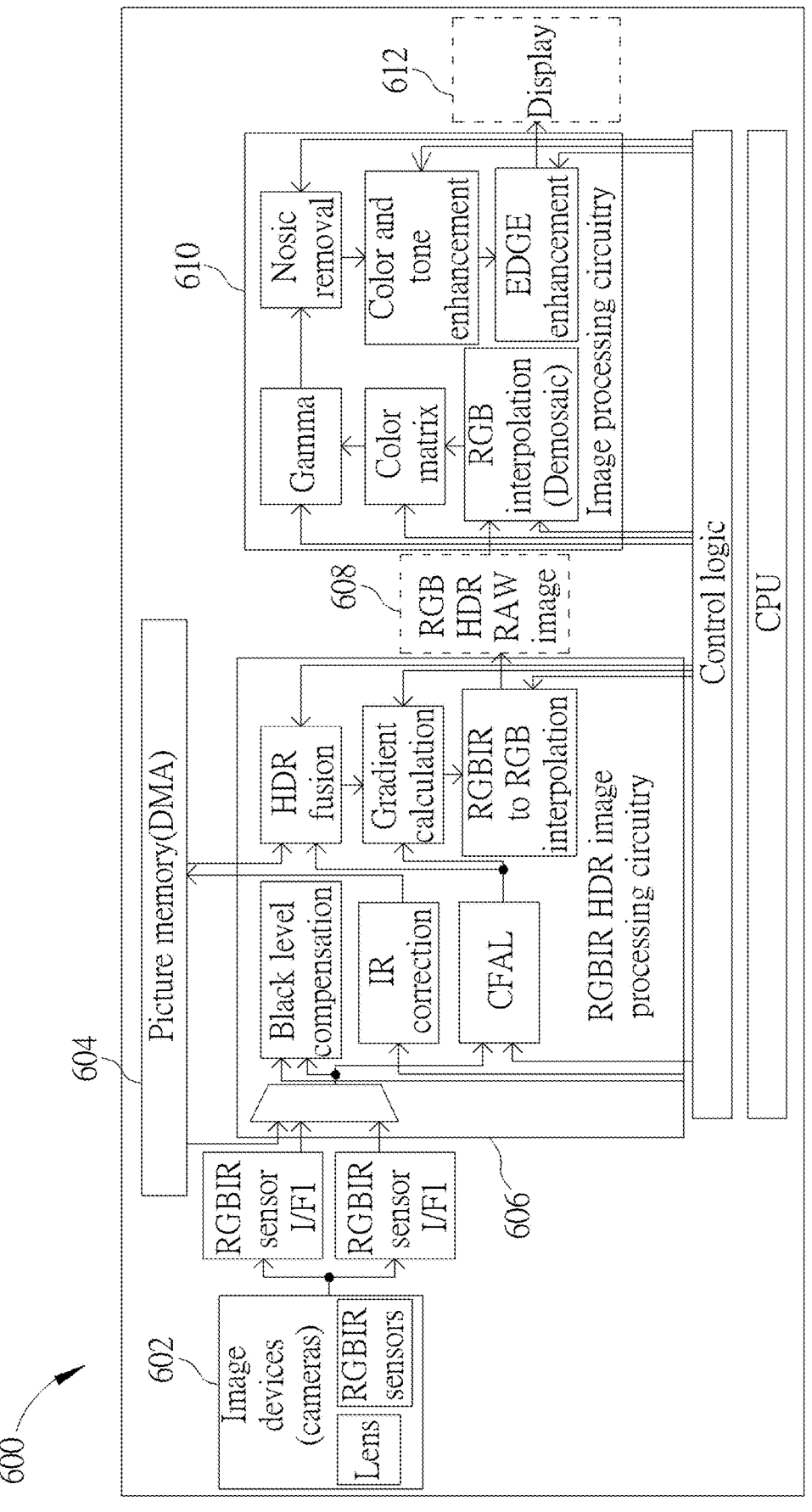
FIG. 6 is an apparatus for processing RGBIR multi-frame HDR with luma according to an embodiment of the present invention.

FIG. 6 is an apparatus 600 for processing RGBIR (Red Green Blue Infrared) multi-frame HDR (High Dynamic Range) with luma according to an embodiment of the present invention. The apparatus 600 includes a plurality of cameras 602, a picture memory 604, an RGBIR HDR image processing circuit 606, an image processing circuit 610, and a display 612. The plurality of cameras 602 is used to capture a plurality of RGBIR raw images 402 with different exposure times. The RGBIR HDR image processing circuit 606 is coupled to the plurality of cameras 602, and used to generate a plurality of luma images 406 using a color filter array luma (CFAL) filter 404 according to the plurality of RGBIR raw images 402, to perform IR color correction 408 to generate a plurality of corrected RGBIR raw images according to the RGBIR raw images 402, to perform HDR fusion 410 to generate a HDR RGBIR raw image 412 according to the plurality of luma images 406 and the plurality of corrected RGBIR raw images, to generate gradients 414 according to the HDR RGBIR raw image 412 and the plurality of luma images 406, and to perform interpolation 416 to generate a result image 608 according to at least the gradients and the HDR RGBIR raw image 412. The image processing circuit 610 is coupled to the RGBIR HDR image processing circuit 606, and used to perform image processing on the result image 608 to generate a display image. The display 612 is coupled to the image processing circuit 610, and used to display the display image.

In an embodiment, the picture memory 604 is coupled to the RGBIR HDR image processing circuit 606, and used to store the plurality of corrected RGBIR raw images and provide the plurality of corrected RGBIR raw images to perform the HDR fusion 410. In an embodiment, the image processing circuit 610 performs RGB interpolation, color matrix, gamma correction, noise removal, color and tone enhancement, and edge enhancement on the result image to generate the display image. At last, the display image is displayed on a display 612.

In conclusion, the luma images 406 generated by the CFAL filter 404 are used to calculate the blending weights of RGBIR raw images 402 for HDR fusion 410. Compared to the prior art, the luma images 406 are calculated directly by a single CFAL filter 404, which can save a huge amount of calculation cost in this invention. The HDR fusion 410 is performed before interpolation 416, which can also reduce calculation cost in this invention. The HDR fusion process 410 takes luma images including IR pixel information as reference, thus improving image detail.

The scope of the embodiments extends beyond mere hardware implementation, encompassing the idea of designing processes through software. In other words, the embodiments may be realized through either hardware implementation, software design, or a combination of both.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for processing RGBIR (Red Green Blue Infrared) multi-frame HDR (High Dynamic Range) with luma, comprising:

capturing a plurality of RGBIR raw images with different exposure times by at least one camera;

generating a plurality of luma images using a color filter array luma (CFAL) filter according to the plurality of RGBIR raw images;

performing IR color correction to generate a plurality of corrected RGBIR raw images according to the RGBIR raw images;

performing HDR fusion to generate a HDR RGBIR raw image according to the plurality of luma images and the plurality of corrected RGBIR raw images;

generating gradients according to the HDR RGBIR raw image and the plurality of luma images; and performing interpolation to generate a result image according to at least the gradients and the HDR RGBIR raw image.

2. The method of claim 1, wherein the result image is a HDR RGB raw image, or a full RGB and IR HDR image.

3. The method of claim 1, wherein performing interpolation to generate the result image according to at least the gradients and the HDR RGBIR raw image is performing interpolation to generate the result image according to the gradients, the HDR RGBIR raw image, and the plurality of luma images.

4. The method of claim 3, wherein the result image is a HDR RGB CFA (Color Filter Array) raw image, a HDR RGBW (Red Green Blue White) raw image, a HDR RCCB (Red Clear Clear Blue) raw image, or a HDR RCCC (Red Clear Clear Clear) raw image.

5. The method of claim 1, wherein the result image is an IR image, and the method further comprises controlling an exposure time of each of the at least one camera according to the IR image and/or the corresponding luma image.

6. The method of claim 5, wherein controlling the exposure time of each of the at least one camera according to the IR image and/or the corresponding luma image is controlling the exposure time of each of the at least one camera according to histograms of the IR image and/or the corresponding luma image.

7. The method of claim 6, wherein controlling the exposure time of each of the at least one camera according to the histograms of the IR image and/or the corresponding luma image is when high values of luma exceed 50% of the histograms of the IR image and/or the corresponding luma image, the exposure time is reduced, and when the low values of luma exceed 50% of the histograms of the IR image and/or the corresponding luma image, the exposure time is increased.

8. The method of claim 1, wherein the result image is an IR image, and the method further comprises controlling a light source of each of the at least one camera according to the IR image and/or the corresponding luma image.

9. The method of claim 8, wherein controlling the light source of each of the at least one camera according to the IR image and/or the corresponding luma image is controlling the light source of each of the at least one camera according to histograms of the IR image and/or the corresponding luma image.

10. The method of claim 9, wherein controlling the light source of each of the at least one camera according to the histograms of the IR image and/or the corresponding luma image is when high values of luma exceed 50% of the histograms of the IR image and/or the corresponding luma image, power of the light source is reduced, and when the low values of luma exceed 50% of the histograms of the IR image and/or the corresponding luma image, power of the light source is increased.

11. The method of claim 1, wherein the CFAL filter is an N×N matrix when the plurality of RGBIR raw images are based on 4×4 pattern, where N is an odd integer larger than 4.

12. The method of claim 11, wherein a sum of elements in the CFAL filter is 1.

13. The method of claim 12, wherein a ratio of R elements, B elements, IR elements, and G elements of a computing result using the CFAL filter on pixels in any window of an image is fixed.

14. The method of claim 13, wherein the ratio of R elements, B elements, IR elements, and G elements of the computing result using the CFAL filter on pixels in any window of the image is 1:1:2:4.

15. The method of claim 1, wherein the CFAL filter is an N×N matrix when the plurality of RGBIR raw images are based on 2×2 pattern, where N is an odd integer larger than 2.

16. The method of claim 15, wherein a sum of elements in the CFAL filter is 1.

17. The method of claim 16, wherein a ratio of R elements, B elements, IR elements, and G elements of a computing result using the CFAL filter on pixels in any window of an image is fixed.

18. The method of claim 17, wherein the ratio of R elements, B elements, IR elements, and G elements of the computing result using the CFAL filter on pixels in any window of the image is 1:1:1:1.

19. The method of claim 1, wherein performing HDR fusion to generate the HDR RGBIR raw image according to the plurality of luma images and the plurality of correct RGBIR raw images is performing HDR fusion to generate the HDR RGBIR raw image according to the plurality of corrected RGBIR raw images with weightings generated by the plurality of luma images.

20. The method of claim 19, wherein a short exposure RGBIR image corresponds to larger weightings with high values of luma and smaller weightings with low values of luma, and a long exposure RGBIR image corresponds to larger weightings with low values of luma and smaller weightings with high values of luma.

21. An apparatus for processing RGBIR (Red Green Blue Infrared) multi-frame HDR (High Dynamic Range) with luma, comprising:

a plurality of cameras, configured to capture a plurality of RGBIR raw images with different exposure times;

an RGBIR HDR image processing circuit, coupled to the plurality of cameras, and configured to generate a plurality of luma images using a color filter array luma (CFAL) filter according to the plurality of RGBIR raw images, to perform IR color correction to generate a plurality of corrected RGBIR raw images according to the RGBIR raw images, to perform HDR fusion to generate a HDR RGBIR raw image according to the plurality of luma images and the plurality of corrected RGBIR raw images, to generate gradients according to the HDR RGBIR raw image and the plurality of luma images, and to perform interpolation to generate a result image according to at least the gradients and the HDR RGBIR raw image;

an image processing circuit, coupled to the RGBIR HDR image processing circuit, and configured to perform image processing on the result image to generate a display image; and a display, coupled to the image processing circuit, and configured to display the display image.

22. The apparatus of claim 21, further comprising:

a picture memory, coupled to the RGBIR HDR image processing circuit, and configured to store the plurality of corrected RGBIR raw images and provide the plurality of corrected RGBIR raw images to perform the HDR fusion.

23. The apparatus of claim 21, wherein the image processing circuit performs RGB interpolation, color matrix, gamma correction, noise removal, color and tone enhancement, and edge enhancement on the result image to generate the display image.

24. The apparatus of claim 21, wherein the result image is a HDR RGB raw image, a full RGB and IR HDR image, a HDR RGB CFA (Color Filter Array) raw image, a HDR RGBW (Red Green Blue White) raw image, a HDR RCCB (Red Clear Clear Blue) raw image, or a HDR RCCC (Red Clear Clear Clear) raw image.

25. The apparatus of claim 21, wherein the CFAL filter is an N×N matrix when the plurality of RGBIR raw images are based on 4×4 pattern, where N is an odd integer larger than 4.

26. The apparatus of claim 25, wherein a sum of elements in the CFAL filter is 1.

27. The apparatus of claim 26, wherein a ratio of R elements, B elements, IR elements, and G elements of a computing result using the CFAL filter on pixels in any window of an image is fixed.

28. The apparatus of claim 27, wherein the ratio of R elements, B elements, IR elements, and G elements of the computing result using the CFAL filter on pixels in any window of the image is 1:1:2:4.

29. The apparatus of claim 21, wherein the CFAL filter is an N×N matrix when the plurality of RGBIR raw images are based on 2×2 pattern, where N is an odd integer larger than 2.

30. The apparatus of claim 29, wherein a sum of elements in the CFAL filter is 1.

31. The apparatus of claim 30, wherein a ratio of R elements, B elements, IR elements, and G elements of a computing result using the CFAL filter on pixels in any window of an image is fixed.

32. The apparatus of claim 31, wherein the ratio of R elements, B elements, IR elements, and G elements of the computing result using the CFAL filter on pixels in any window of the image is 1:1:1:1.

* * * * *